Feb. 12, 1957     J. N. MARSHALL     2,781,509
SIDE-LOBE REJECTION CIRCUIT FOR PULSE RADAR SYSTEM
Filed Nov. 30, 1948     2 Sheets-Sheet 1
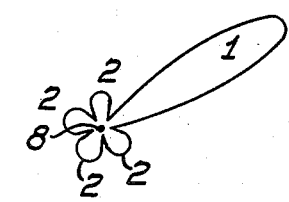
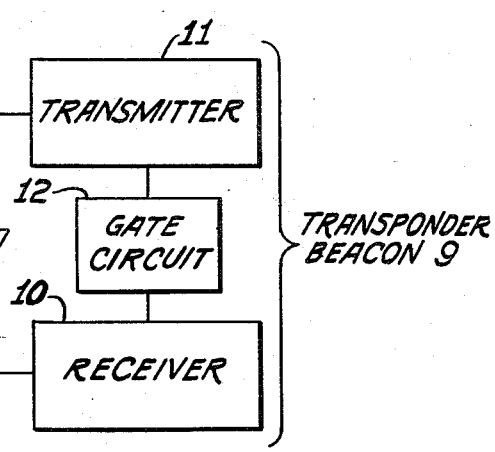
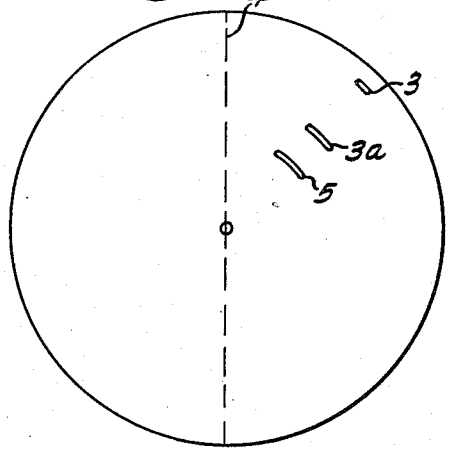
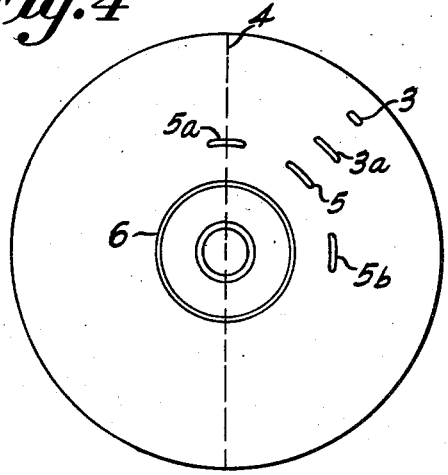
INVENTOR
John N. Marshall
BY
ATTORNEY Feb. 12, 1957 J. N. MARSHALL 2,781,509
SIDE-LOBE REJECTION CIRCUIT FOR PULSE RADAR SYSTEM
Filed Nov. 30, 1948 2 Sheets-Sheet 2

INVENTOR
John N. Marshall
BY
ATTORNEY

United States Patent Office 2,781,509
Patented Feb. 12, 1957

2,781,509

SIDE-LOBE REJECTION CIRCUIT FOR PULSE RADAR SYSTEM

John Nathaniel Marshall, Philadelphia, Pa., assignor to Radio Corporation of America, a corporation of Delaware Application November 30, 1948, Serial No. 62,716

10 Claims. (Cl. 343—6.5)

This invention relates to improvements in control circuits and more particularly to improved side-lobe rejection control circuits for pulse radio receivers as used in radar transponder beacons.

The term "transponder" as used herein is intended to mean a beacon including a receiver designed to receive signals which are referred to hereinafter as "interrogation" or "trigger" signals, and a transmitter controlled by the output of said receiver to transmit other signals which are called "reply" signals.

In general according to the present invention there is placed in series between the input and output of pulse receiving apparatus a gating device passing only pulses which exceed the amplitude of a bias for the device so as selectively to pass through the apparatus only main lobe pulses, and the apparatus comprises a circuit responsive to the amplitude of received pulses to generate an appropriate bias for the device.

One use for transponder beacons is in aircraft which are to be located and identified by search radar apparatus. A beacon will provide a reply signal which is much stronger than the reflected radar signal; the reply signal may be on a different frequency from the radar signal, enabling the separation at the radar station of "ground clutter" or fixed echoes from the desired reply signals. Usually the reply signal is coded in some manner to indicate the identity of the aircraft and/or its approximate altitude.

A radar signal of at least a certain minimum strength is required at the beacon receiver in order to operate the beacon transmitter. As a corollary, the beacon ordinarily will be triggered by any radar signal which is stronger than said minimum. This would not be particularly objectionable if the radar antenna could transmit only in one direction at a time; however, the directive pattern of a typical radar antenna includes not only a relatively sharp main lobe (see 1, Fig. 2), but also a number of secondary lobes (see 2, Fig. 2), which extend throughout a wide angle in azimuth.

When the transponder is at a considerable distance from the radar station, for example 100 miles, the signal strength is sufficient to trigger it only when the main lobe is pointed toward the aircraft. Assuming that the radar is of the PPI (plan position indicator) type, the resulting indication will be a small spot or "pip" (see 3, Figs. 3 and 4) at a radial distance from the center of the display corresponding to the distance of the aircraft from the radar station, and at an angle, with respect to some reference direction (4, Figs. 3 and 4) corresponding to the bearing of the craft.

An aircraft which is somewhat closer to the ground station, for example, at a distance of 75 miles, will receive a signal of the requisite strength during a greater portion of the sweep of the radar beam, producing a wider pip (32, Figs. 3 and 4) on the radar display. The bearing of the aircraft can still be found simply by determining the center of the widened pip. As the craft approaches the ground station a point will be reached where the signal strength in the side lobes is enough to operate the transmitter.

When this happens, besides a main lobe pip (5, Figs. 3 and 4) additional pips appear in the display of an actual radar, these corresponding to the larger side lobes which unavoidably will occur in its antenna pattern (see 5a and 5b, Fig. 4). As the craft comes still closer to the radar, smaller side lobes produce pips (not shown in Fig. 4), and finally sufficient energy is received to trigger the beacon at all azimuths, and produce a full circle on the display (6, Fig. 4). There is no way of determining the bearing of an aircraft from a circular trace.

Figure 3 represents a hypothetical display which would be produced if the antenna were free of side lobes and would include only main lobe pips. In the prior art, it has been known to prevent the above-described broadening of indications in the radar display by varying the minimum signal level required to operate the beacon according to the maximum strength of the radar signal being received at the beacon, i. e., by using an automatic gain control circuit which responds to the signals received during the time the main lobe of the radar beam travels past the aircraft and maintains control of the receiver during the entire scanning period of the radar. An arrangement of this kind is described in copending application Serial No. 788,198, filed November 26, 1947, now Patent No. 2,594,916 dated April 29, 1952.

Experience has shown that a most undesirable effect is produced by using an A. G. C. circuit under control of a voltage generated from very low duty cycle pulses.

It is well known that radar pulses are normally of extremely short duration, as compared to the periods between them, so that even if they could be received as continuous trains of pulses, they would have very low duty cycles, such as of the order of .001.

Moreover, the duty cycle of the radar pulses actually received at the beacon is even lower. As the radar scans in azimuth its beam will bear on and deliver pulses to the beacon receiver for a small fraction of each scanning period, for the rest of which it will either be rotating away from, or back toward, the plane. For example, consider a typical search radar which scans the horizon in say five seconds. If the half-power width of the main lobe is of the order of one degree, the time required for it to sweep past a given point is $\frac{1}{360} \times 5$ seconds or about 14 milliseconds and the duty cycle of the received pulses will be about .001/360. Because of this, it is difficult to devise a control-voltage-generating system which can charge a condenser fast enough in response to perhaps 14 pulses of one microsecond duration each and at the same time have both a long enough time constant to retain the charge over a period of five seconds and an output impedance not very much higher than the finite input impedance of the device which is to be controlled.

Unless extreme measures are taken, the generated control voltage will decay noticeably during one azimuthal scan of the radar. Moreover, besides being difficult to avoid, this decay is actually necessary, since for maximum operational flexibility it is desirable that as a plane carrying a beacon flies away from a radar the sensitivity of its receiver should soon return to normal, i. e., that the control voltage should bleed off within three or four scanning cycles of the radar antenna. However, this results in a most undesirable effect where such a voltage is used for A. G. C. since its rate of decay will be multiplied by the gain of the stage or stages which it controls. Therefore, the overall sensitivity of the receiver will vary over an excessively large range during each scan of the radar.

Since the purpose of such gain control circuits is to exclude secondary lobe pulses, they must be adjusted so that at the end of each radar scanning cycle (when the control voltage has decayed to the greatest extent, and a condenser of the generating circuit is just about to be recharged) the A. G. C. will still hold the sensitivity of the receiver low enough to exclude secondary lobe pulses. As a result, at all earlier points of the scanning cycle the sensitivity will have been reduced far beyond what is necessary for excluding secondary lobe pulses. Thus, for a large portion of each antenna scanning cycle the gain control will be set at such a high level that it will reject not only secondary lobe pulses of the radar transmitting the strongest pulses to the beacon, but also the main lobe pulses of more distant and/or weaker radars. This means that for a good portion of each scanning cycle of the strongest radar, the beacon will be unresponsive to more than one radar at a time except for possible rare cases in which two or more radars happen to deliver at the beacon main lobe pulses of approximately equal signal strengths. Usually, of course, a single radar transmitting the strongest main lobe signals to the beacon, for example, the nearest radar, will set the gain control of the beacon receiver to render it at least periodically unresponsive to main lobe signals of all other radars whose indicators therefore will not present complete information.

It is an object of the present invention to devise an improved side lobe rejection circuit for a receiver of radar pulses, such as a receiver of a transponder beacon, which will reject pulses whose signal strengths are below a level which is slightly higher than that of the largest side lobe signals of the strongest radar, but will not reject pulses with signal strengths above that level, whereby the receiver will be very sensitive to main lobe pulses, of most of the surrounding radars even though they include distant ones, since ordinarily main lobe pulses are many times stronger than side lobe pulses.

It is a further object of the invention to devise a circuit of the kind mentioned above which includes a gating device for rejecting the secondary lobe pulses, in which pulses received from a radar control the establishment of a bias voltage having a magnitude determined by the signal strength of the largest secondary lobe pulses, the bias being applied to the gating device for limiting pulse transmissions through it to pulses larger in magnitude than the largest secondary lobe pulses, and in which the gating device is not an amplifier, whereby small variations in the bias voltage will not cause wide variations in the sizes of pulses which will be rejected.

Other objects, features and advantages of this invention will be apparent to those skilled in the art from the following description of the invention and the accompanying drawing in which:

Figure 1 is a schematic diagram of a radar and transponder system according to the present invention;

Figure 2 is a polar graph of a typical directive pattern of a search radar antenna;

Figure 3 shows the display which would be produced by a search radar in response to aircraft at the same bearing but at various distances if its directive antenna were free of secondary lobes;

Figure 4 shows the type of display which may be produced by a search radar in response to aircraft carrying transponder beacons;

Similar reference characters are applied to similar elements throughout the drawings.

Figure 6:
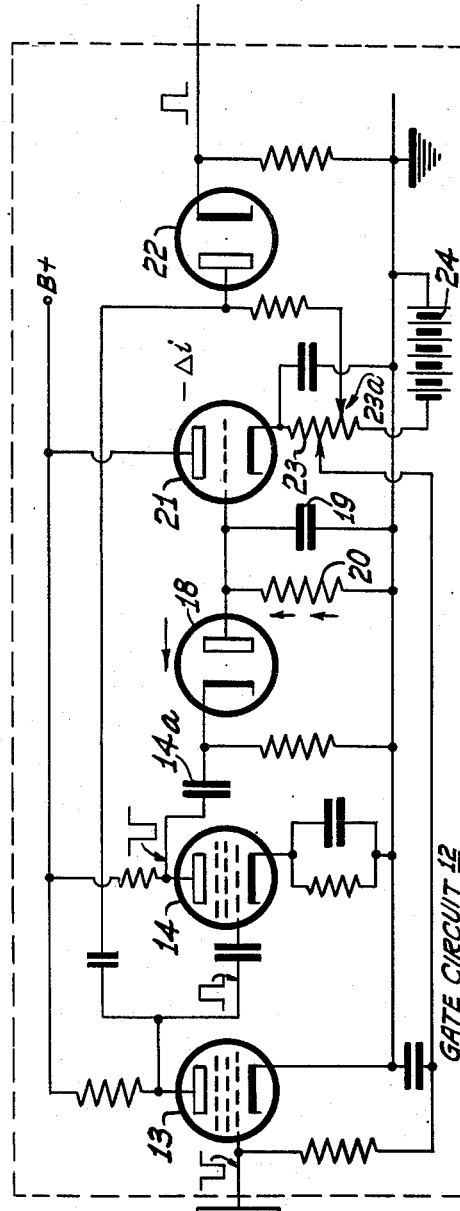
Figure 6 illustrates an alternate embodiment of a gating circuit 12 of Figure 1.

Referring to Figure 1, a ground-based search radar set transmits from antenna assembly 8 a pulse-modulated radio signal in a horizontally directive beam which is rotated slowly in azimuth to scan the surrounding territory. Aircraft and all other reflecting objects in the territory reflect some of the transmitted energy back to the radar. The reflections can be detected and indicated by the radar; however, it is desirable to distinguish between aircraft and other objects.

This is accomplished by providing on each craft with which the system is to be used, a transponder beacon 9 which is "triggered" by signals received from the radar station to send out reply signals on a frequency different from that of the radar system. To this end, as is shown in Figure 1, the beacon comprises a receiver 10 which receives the radar pulses and a transmitter 11 which is triggered by the pulses after they have been detected in the receiver. The reply signals are received at the radar system, for example, on appropriate elements of antenna assembly 8, and act to produce a display which shows only the aircraft equipped with transponders.

According to the present invention, the output pulses of the receiver 10 are applied to transmitter 11 through a gate circuit 12 which acts to pass to transmitter 11 substantially only main lobe radar pulses.

Figure 5:
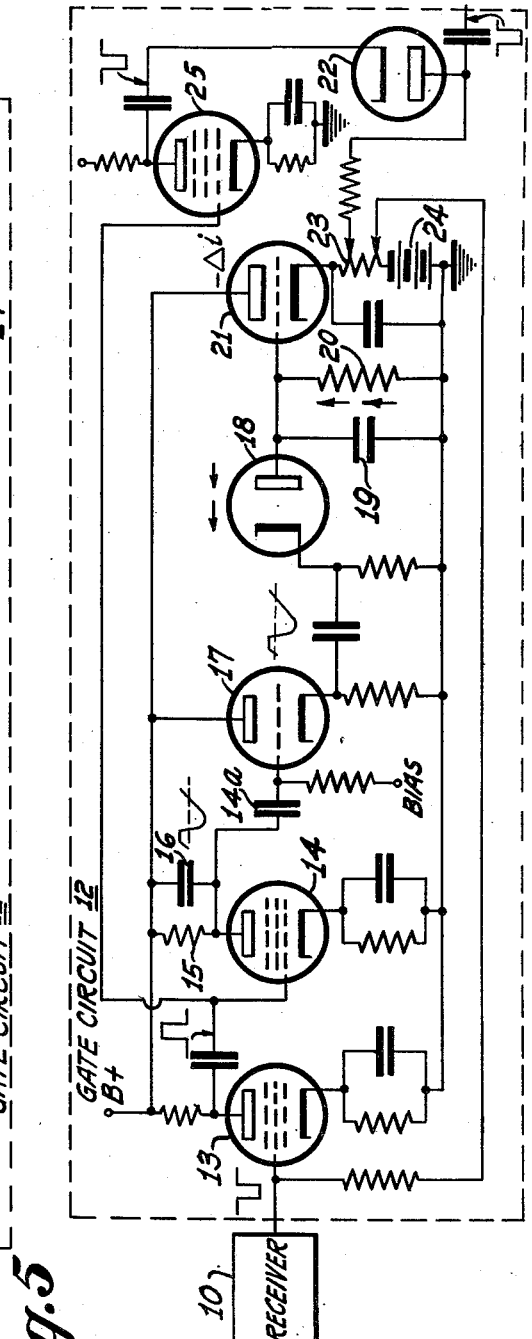
Figure 5 illustrates details of one embodiment of a gating circuit 12 of Figure 1.

Figure 5 shows one embodiment of the gate circuit according to the present invention. The output of receiver 10 is applied in gate circuit 12 to an amplitude regulator tube 13, the gain of which is automatically controlled. To this end, tube 13 is preferably a variable Mu tube. The reason why automatic gain control is used is that at a later point in the gate circuit the peak level of the strongest received pulses, i. e., the main lobe radar pulses, will be used to control the level of a bias-voltage generated in this circuit for controlling a gate tube 22. If no gain control were used for regulator tube 13, it would be possible for very strong radar pulses to saturate either this tube itself or a later-occurring tube of the gate circuit with the result that the peak value of the pulse would be lost as a reference. The output pulses of tube 13 are applied as pulses to a gate tube 22 besides being converted into a bias for that tube. Thus, both the magnitude of the bias for the gate tube and the amplitude of the pulses which it must gate selectively will be functions of whatever amount of gain control is in effect at any time.

Regulator tube 13 preferably is biased for class A operation over all of its automatically controlled range of operation. Switch tube 14 may be considered the input tube of the bias generating portion of the circuit of Figure 5. It should be biased at or below cut-off so as to pass no current except while it is receiving positive pulses from regulator tube 13. Switch tube 14 should not be saturated by any of the pulses received from regulator tube 13 so that the magnitude of the current which it draws during a positive pulse will be proportional to the amplitude of the pulse.

In its anode circuit there is a pulse stretching circuit comprising in parallel a resistor 15 and a capacitor 16. For each positive pulse received on the grid of switch tube 14 its plate current will abruptly increase rapidly charging capacitor 16. After the pulse has ceased to be applied the switch tube will become an open circuit, and capacitor 16 will slowly discharge through its shunt resistor 15. Capacitor 16, resistor 15 and switch tube 14 should be so selected that during each pulse the capacitor will be fully charged to a level related to the peak amplitude of the pulse, and that it will substantially complete its discharge through resistor 15 in the period between that pulse and the next one. In this way, each negative output pulse of tube 14 will be stretched to have a much greater duration that the input pulse which produced it. Because of the A. C. coupling through a capacitor 14a from tube 14 to the tube 17 following it, the stretching circuit 15, 16, should not have a longer discharge time than the interval between pulses. Switch tube 14 preferably should have large power sensitivity, i. e., should be capable of producing a large A. C. power output for a given input train of pulses. Due to the characteristic of switch tube 14 and the stretching action of circuit 15, 16, the A. C. output of tube 14 includes a great deal more energy than the input pulses.

Signals from the switch tube 14 are fed to a cathode follower tube 17 which will make the same voltage available to following elements at an even lower output impedance. This cathode follower tube should be biased for class A operation. Its output is applied to a diode rectifier 18 which is appropriately connected to pass current when the output of tube 17 is negative-going. The negative pulses from the output of rectifier 18 charge up a condenser 19 in a very long time constant circuit comprising condenser 19 and a shunt resistor 20. The time constant of condenser 19 and resistor 20 should be sufficiently large so that a D. C. voltage stored in condenser 19 will last for several scans of the radar. It is obvious that the bias voltage which is to be generated in this circuit does not have to be generated in response to a single stretched radar pulse. As explained above, a train of some 14 pulses will be received when the main lobe passes across the beacon receiver antenna and current may be drawn by rectifier 18 for several of these so that the negative voltage output of the tube may increase stepwise and then very slowly decay. In fact, it would not be seriously objectionable if the output of tube 14 were to be incapable of reaching a negative peak value related to the peak values of the input pulses until after the radar has scanned the beacon with its main lobe three or four times. The temporary appearance of side lobe indications on the PPI would be an insignificant inconvenience.

In order further to lower the impedance of the negative voltage derived from rectifier 18, it is passed through a second cathode follower 21, portions of the output of which are applied back to regulator tube 13 as an A. G. C. voltage and to the gate tube 22 as a bias voltage. The second cathode follower 21 is adjusted normally to draw some current so that a positive voltage will be developed across its cathode load resistor 23. A source of negative potential, such as battery 24, is connected in series with the cathode load resistor 23 and provides a potential of sufficient magnitude so that in the absence of any input from rectifier 18, 19, 20 at least a portion of resistor 23 will be at or below ground potential. When pulses are received in gate circuit 12 a negative voltage proportional to the size of the peak amplitudes of the largest pulses produced in the output of regulator tube 13 will be applied on the grid of the second cathode follower tube 21 to reduce both its discharge current (as indicated by $-\Delta i$ in Figure 5) and the positive drop across its cathode load resistor 23. Because of this and since the value of the negative potential provided by source 24 will remain constant, the potential appearing at any point on the cathode resistor 23 will change in a negative direction by an amount depending on the change of current $(-\Delta i)$ through the tube. The cathode load resistor may be a potentiometer having two sliding contacts, one for providing an adjustable A. G. C. voltage output which is connected back to the control grid of the regulator tube 13, and another for providing bias for the gate tube 22.

The positive pulses from the output of the regulator tube 13 are applied to an inverter tube 25 from which they are fed to the cathode of the diode gate tube 22 in negative polarity. By proper adjustment of the upper sliding tap on the cathode load resistor 23 and by proper selection of the circuit parameters and the adjustment of the A. G. C., the only negative pulses which will pass through the diode gate tube 22 will be those larger than any pulses received as side lobe transmissions.

It should be noted that the level of the A. G. C. and bias voltages generated in the gate circuit 12 of Figure 5 will be proportional to the peak value of the main lobe pulses. Since for a well designed directive radar antenna there will be a certain minimum ratio between the value of main lobe pulses and the largest minor lobe pulses, the level of the main lobe pulses can be used as a reference for controlling the generated voltages to relate them to the level of the largest side lobe pulses and the bias voltage may be used as a reference to provide a threshold voltage at the gate tube 22 to prevent it from passing any secondary lobe pulses.

Figure 6 shows an alternate embodiment of a gating circuit suitable in the present system. In this embodiment, the level of the bias voltage for the gating tube is generated so as more directly to be a function of the peak levels of the strongest side lobe pulses, this result being attained by clipping the tops of the main lobe pulses so that their peak value is not used as a reference level. In the arrangement of Figure 6, the duty cycle of the received signal energy is considerably higher during the generation of the gate tube bias, inasmuch as regulator tube 13 operates with high enough average gain so that the generating portion of the circuit receives and is actuated by secondary lobe pulses as well as main lobe pulses. For this reason, it may be possible to use one less stage of integration than in the embodiment of Figure 5. Accordingly, the circuit of Figure 6 does not include either pulse stretcher circuit 15, 16 or cathode follower tube 17. Instead, the negative output of switch tube 14, unstretched and without the benefit of the lowered output impedance provided by a tube corresponding to cathode follower tube 17, is applied to rectifier 18 whose discharge path, as in Figure 5, is connected in series with a condenser 19 which is shunted by a resistor 20 to form a long-time constant integrating circuit. It is evident that rectifier 18 of Figure 6 will function in the same manner as rectifier 18 of Figure 5 and that it thus will produce a negative potential having a magnitude related to that of the peak level of pulses which pass through switch tube 14 unclipped. This negative potential is applied to a cathode follower 21 in the same manner as in the Figure 5 embodiment, and similarly, the cathode output of this tube provides an A. G. C. voltage for regulator tube 13 and a threshold-establishing bias voltage for gating tube 22. In Figure 6 the need for an inverter tube 25 is avoided by applying the positive pulses from the output of regulator tube 13 to the anode of the gate tube 22, rather than to its cathode. By proper adjustment of the lower sliding tap 23a of the cathode load resistor 23, the bias voltage for the gate tube 22 may readily be set to reject the very side lobe pulses which caused the bias voltage to be generated. Thus, only the main lobe pulses will pass through the gate tube 22. If pulses are received from another radar, they will also be impressed on the gate circuit. However, if they are of lower average strength neither the main lobe pulses nor the side lobe pulses will materially affect the bias level set up by this circuit. On the one hand, the main lobe pulses will have little effect, for reasons to be described below, and, on the other, the secondary lobe pulses will have peak values too low to affect the level of the D. C. voltage produced by rectifier 18.

In order to render main lobe pulses ineffective in controlling the level of biases generated in the circuit of Figure 6, switch tube 14 is adjusted to be saturated by these pulses. Such adjustment will not be difficult to attain because of the large contrast between the amplitudes of main lobe pulses and side lobe pulses. Once switch tube 14 is set up for these operating conditions, the regulation of its input which is accomplished by the regulator tube 13, will assure such operation despite variations in the strength of the received radar signals.

Obviously, switch tube 14 must have sufficient gain so that the bias voltage for the gate tube will be above the peak level of the largest side lobe pulses.

The arrangement of diode gate tube 22 in the circuits of Figures 5 and 6 should not be confused with biased diode clipping arrangements in which a biased shunt diode draws current only to clip all peak portions of an input voltage which exceed a predetermined reference level. In the present arrangement, the diode (gate tube) is series connected in the pulse channel and transmits the accepted pulses through its own discharge path, the threshold bias rendering it ineffective thus to pass any pulses below the bias level. This bias may be applied to either electrode of the diode in order to accomplish this result, the only difference being that it should be of opposite polarity when it is applied to the cathode.

While in the example shown herein, the gating circuit is shown to be a component separate from the beacon receiver, it is apparent that the elements comprising the circuit may be built into the receiver itself.

It is also apparent that a receiver operating in conjunction in such a gating circuit, or a special receiver built or modified to include one, may be used by itself, for example, as a search receiver, rather than necessarily in conjunction with a transmitter as part of a beacon.

In the arrangement shown herein, there will be no amplification of the rate of bias decay. Accordingly, if the generating circuit is intended to retain the bias for about four or five scans of the radar antenna, the pulse-rejection level at which the gate circuit operates will not vary excessively during a single scanning cycle.

It is obvious that a multi-element discharge device including a control grid may be used for the gate tube in place of diode 22. Where this is done, the control grid should be biased either below cut-off or above saturation to an extent determined by the magnitude of the bias control voltage generated by the gate circuit and the radar pulses should be applied to the same control grid in appropriate polarity to oppose the cut-off or saturating bias, as the case may be. If main lobe pulses are positive so as to overcome a negative cut-off bias, the gate tube will produce negative output pulses, or if they are negative so as to overcome a positive saturating bias, the gate tube will produce positive output pulses. While this type of gate tube will provide gain, this gain will not vary as a function of the magnitude of the bias control voltage and therefore, this arrangement will not have the above-described shortcoming of prior art A. G. C. circuits, i. e., that of varying the receiver sensitivity over each radar scanning period by a factor proportional to any variation of the bias control voltage multiplied by the gain of one or more amplifier stages controlled by the bias control voltage.

I claim as my invention:

1. Receiving apparatus for radio signals which include pulses having a low duty cycle comprising means including a storage condenser and responsive to received pulses to charge the condenser to a voltage determined by the amplitude of the pulses, a circuit of very long time constant for discharging the condenser, a gating device for selectively passing only pulses exceeding an amplitude determined by a bias applied to the device, a coupling circuit having an input connected to the condenser and responsive to a charge therein to apply to the device a bias proportional thereto, and a circuit for applying pulses received at the input of the receiving apparatus to the gating device for selective transfer therethrough according to said bias.

2. In a radar system including a ground-based radar set which produces a beam of pulse-modulated radio transmissions and cyclically scans a surrounding area therewith, at least one mobile station including receiving apparatus for said radio transmissions, the receiving apparatus comprising means including a storage condenser responsive to received pulses to charge the condenser to a voltage determined by the amplitude of received radar pulses, a circuit of very long time constant for discharging the condenser, a gating device for selectively passing only pulses exceeding an amplitude determined by a bias applied to the device, a coupling circuit having an input connected to the condenser and responsive to a charge therein to apply to the device a bias proportional thereto, and a circuit for applying pulses received at the input of the receiving apparatus to the gating device for selective transfer therethrough according to said bias.

3. In a radar system including a ground-based radar set which produces a beam of pulse-modulated radio transmissions and cyclically scans a surrounding area therewith, at least one mobile station comprising a receiver responsive to signals from said ground station and a transmitter responsive to output from said receiver to transmit reply signals to said search radar, means for preventing transmission of said reply signals from said mobile station in response to side lobe pulse transmissions from said beam including, means responsive to pulses received at said mobile station to provide a voltage wave whose amplitude will remain above a value proportional to the amplitude of said received pulses during continued reception thereof and will substantially fully decay thereafter over a period of time equal to several periods of said cyclical scanning, a gating device for selectively passing only pulses exceeding an amplitude determined by a bias applied to the device, and means for applying said voltage to the gating device as a bias therefor.

4. In a radio receiver for receiving from a radar having a directive antenna signals which comprise cyclically repeated short trains of pulses transmitted in its main lobe, a rectifier, means including a gain-controlled amplifier for applying to said rectifier signals received from the radar, a load circuit connected to said rectifier and including a storage capacitor and a discharge resistor having such capacitance and resistance that said capacitor is substantially fully charged during the reception of a small number of said trains of signal pulses and is discharged during several periods of the cyclical repetition of said trains, impedance translating means for receiving from said capacitor a voltage produced by charging it and for translating it into an output voltage which is proportional thereto and as available from an element of said means at a lower output impedance than that of said load circuit, a gating device for selectively passing only pulses exceeding an amplitude determined by a bias applied to the device, a connection from a point of said element to said device to apply said output voltage to it as a bias, a connection from the output of the gain-controlled amplifier to the gating device for applying pulses thereto for their selective transfer therethrough.

5. In a radio receiver as in claim 4 and including a second connection, the second connection extending from a point of said element to a gain-controlling electrode of the gain-controlled amplifier.

6. In a radio receiver for receiving signals which comprise cyclically repeated short trains of pulses, a rectifier, means including a gain-controlled amplifier for applying said received signals to said rectifier, a load circuit connected to said rectifier and including a storage capacitor and a discharge resistance having such capacitance and resistance that said capacitor is substantially fully charged by a small number of said trains of signal pulses and is discharged during several periods of the cyclical repetition of said trains, impedance translating means for receiving a voltage produced by charging said capacitor and producing an output voltage which is proportional thereto and is available from an element of the translating means at a lower output impedance than that of said load circuit, gating means including a discharge device for selectively passing only pulses exceeding an amplitude determined by a bias applied to an electrode of said device, a connection from a point of said element to said electrode of said device for providing said bias, a connection from the output of the gain-controlled amplifier to the gating means for applying pulses thereto for their selective transfer through the gating means.

7. In a radio receiver for receiving signals which comprise cyclically repeated short trains of pulses, a rectifier, means including a gain controlled amplifier for applying said received signals to said rectifier, a load circuit connected to said rectifier and including a storage capacitor and a discharge resistor having such capacitance and resistance that said capacitor is substantially fully charged by a small number of said trains of signal pulses and is not substantially discharged by said resistor during one period of the cyclical repetition of said trains, a cathode follower amplifier, circuit means applying to the input of said cathode follower amplifier a voltage produced by charging said storage capacitor, a unidirectionally-conductive device, a connection from a point of the load resistor of the cathode follower to the side of said device which presents high input impedance to any voltage produced at said point over the operating range of a cathode follower, and a connection from the output of the gain-controlled amplifier to the unidirectional device for applying pulses to one of its sides in proper polarity for their transfer through the device when they exceed the voltage applied to it from said point of the load resistor.

8. In a radio receiver, as in claim 7 in which one cycle of the repeated trains of pulses includes at least a first train of pulses of relatively high signal strength and may include in addition other trains of very much lower signal strength, the pulses in each train being separated by periods which are relatively long compared to the durations of the pulses and said trains being separated by intervals which are relatively long compared to said periods, said means for applying signals to the rectifier also includes a switch tube which is fed from the gain-controlled amplifier and feeds said rectifier, and bias voltage means for said gain-controlled tube adjusted so that when one cycle includes at least one of said other trains of lower strength in addition to said first train of pulses the switch tube will saturate while the pulses of said first train are its input, said point on the load resistor of the cathode follower being selected so that the voltage applied from it to the unidirectional device is related to the peak values of the strongest pulses of any of said other trains of lower signal strength so as to prevent their transfer through the device when they are applied to the device over said connection from the output of the gain-controlled amplifier.

9. In a radio receiver, as set forth in claim 7, in which said means for applying signals to said rectifier comprises in addition to the gain-controlled amplifier a second amplifier having in series with its cathode and anode a circuit for effectively lengthening the duration of said pulses and an electrical connection from said circuit to said rectifier.

10. In a receiver, as in claim 9, in which said electrical connection further comprises an impedance translating amplifier having an input which is connected to said circuit and offers a relatively high input impedance thereto and an output which is connected to the rectifier and offers a relatively low output impedance thereto.

References Cited in the file of this patent
UNITED STATES PATENTS

| | | |
|---|---|---|
| 2,398,490 | Atwood | Apr. 16, 1946 |
| 2,421,017 | Deloraine | May 27, 1947 |
| 2,471,416 | Deloraine | May 31, 1949 |
| 2,506,124 | White | May 2, 1950 |